(12) United States Patent
Kang et al.

(10) Patent No.: US 9,298,578 B2
(45) Date of Patent: Mar. 29, 2016

(54) METHOD AND APPARATUS FOR POWER LOSS RECOVERY IN A FLASH MEMORY-BASED SSD

(75) Inventors: Soo Yong Kang, Gyeonggi-do (KR); You Jip Won, Gyeonggi-do (KR); Jae Hyuk Cha, Gyeonggi-do (KR); Dong Wook Kim, Seoul (KR); Sung Roh Yoon, Seoul (KR); Jong Moo Choi, Gyeonggi-do (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 120 days.

(21) Appl. No.: 14/346,500

(22) PCT Filed: Aug. 31, 2012

(86) PCT No.: PCT/KR2012/006959
§ 371 (c)(1),
(2), (4) Date: Mar. 21, 2014

(87) PCT Pub. No.: WO2013/048023
PCT Pub. Date: Apr. 4, 2013

(65) Prior Publication Data
US 2014/0229767 A1  Aug. 14, 2014

(30) Foreign Application Priority Data
Sep. 29, 2011 (KR) .......................... 10-2011-0098921

(51) Int. Cl.
*G06F 11/00* (2006.01)
*G06F 11/30* (2006.01)
(Continued)

(52) U.S. Cl.
CPC ........ *G06F 11/3062* (2013.01); *G06F 11/1435* (2013.01); *G06F 11/1441* (2013.01);
(Continued)

(58) Field of Classification Search
CPC ............ G06F 12/0246; G06F 11/1441; G06F 11/1471; G06F 11/3058
USPC ...................................................... 714/15, 22
See application file for complete search history.

(56) References Cited

U.S. PATENT DOCUMENTS 7,640,388 B2    12/2009  Nakashima et al.
7,818,610 B2 *  10/2010  Rogers ................ G06F 11/1471
                                                      714/10

(Continued)

FOREIGN PATENT DOCUMENTS

JP     2005-115857 A    4/2005
KR     10-2006-0090088 A    8/2006

(Continued)

OTHER PUBLICATIONS

International Search Report of PCT/KR2012/006959 mailed on Feb. 20, 2013.

*Primary Examiner* — Elmira Mehrmanesh
(74) *Attorney, Agent, or Firm* — Rabin & Berdo, P.C.

(57) ABSTRACT

The present invention relates to a storage device that uses a flash memory that performs power loss recovery, and to a method of power loss recovery by using the storage device using the flash memory. The storage device stores change information on metadata in physical pages in which one or more logical pages are compressed and stored. The change information on the metadata is information representing how the metadata is changed in association with data in the one or more logical pages. The storage device may synchronize the metadata in the flash memory and recover the metadata by applying the change information on the metadata to the synchronized metadata when a power supply is disrupted.

7 Claims, 8 Drawing Sheets

(51) Int. Cl.
*G06F 12/02* (2006.01)
*G06F 11/14* (2006.01)
*G06F 11/16* (2006.01)

(52) U.S. Cl.
CPC ........ *G06F11/1662* (2013.01); *G06F 12/0246* (2013.01); *G06F 12/0253* (2013.01); *G06F 2212/401* (2013.01); *G06F 2212/7207* (2013.01)

(56) References Cited

U.S. PATENT DOCUMENTS

| | | | |
|---|---|---|---|
| 2005/0080762 A1 | 4/2005 | Nakashima et al. | |
| 2007/0028034 A1* | 2/2007 | Nishihara | G06F 12/0804 711/103 |
| 2007/0168698 A1* | 7/2007 | Coulson | G11C 16/349 714/5.11 |
| 2009/0157950 A1* | 6/2009 | Selinger | G06F 12/0246 711/103 |
| 2010/0235565 A1* | 9/2010 | Ton-That | G06F 11/1441 711/103 |
| 2010/0268871 A1 | 10/2010 | Lee et al. | |
| 2011/0231713 A1* | 9/2011 | Takada | G06F 12/0246 714/54 |

FOREIGN PATENT DOCUMENTS

| | | |
|---|---|---|
| KR | 10-2007-0031647 A | 3/2007 |
| KR | 10-2010-0035328 A | 4/2010 |
| KR | 10-2010-0114381 A | 10/2010 |
| KR | 10-2010-0115057 A | 10/2010 |

* cited by examiner

METHOD AND APPARATUS FOR POWER LOSS RECOVERY IN A FLASH MEMORY-BASED SSD

TECHNICAL FIELD

The present invention relates to a storage device based on a flash memory.

The present disclosure provides a storage device using a flash memory for performing a power loss recovery, and a power loss recovery method of the storage device using the flash memory.

BACKGROUND ART

A flash memory may include metadata. The metadata may include a mapping table used for managing data stored in the flash memory, a data structure used for garbage collection, and the like.

In general, to enhance a performance of the flash memory, the metadata may be stored and managed in a static random access memory (SRAM) or a dynamic random access memory (DRAM) corresponding to a volatile memory. Thus, when a power failure unexpectedly occurs in a flash memory storage device, the metadata stored in the volatile memory may be lost.

To solve this issue, information for recovering the metadata may be stored in a spare space of a page of the flash memory on which the data is recorded. Alternatively, all of the metadata may be stored in a metadata storage area of the flash memory at each predetermined time interval.

In a method of storing information for recovering the metadata in the spare space, the flash memory storage device based on a compression may be insufficient to include all data for recovering the metadata in the spare space, due to a limitation on a size of the spare space. Also, the flash memory storage device may need to read an entire area of the flash memory to be recovered from a power failure and thus, a period of recovery time may increase according to an increase in a storage capacity of the flash memory storage device.

In a method of storing all of the metadata at each predetermined time interval, when the metadata is synchronized in the flash memory and the power failure occurs before a subsequent synchronization (sync) is initiated, a reliability of the metadata generated or changed after the most recent sync is performed may not be ensured. Thus, to ensure reliability, the metadata may need to be frequently synchronized in the flash memory.

However, an increase in the storage capacity of the flash memory storage device may lead to an increase in a quantity of the metadata used for managing the stored data and thus, a number of writings may be increased to sync the metadata in the flash memory. When the number of writings is increased, power consumption may be continued, which may affect a durability of the metadata area of the flash memory in which the metadata is stored. Also, reliability of the metadata may not be entirely ensured.

To reduce the power consumption and maintain the durability, changes in the metadata provided during the power failure may be included in a form of a log to be stored in the volatile memory and the data may be stored in the flash memory on a page-by-page basis. However, when the power failure occurs under a circumstance of the data being recorded on the flash memory, and the metadata not being recorded on the flash memory, a portion including a change in the metadata stored in the volatile memory may disappear. Thus, such a method may not entirely ensure the reliability of the metadata.

Korean Patent Publication No. 10-2010-0035328 published on Apr. 5, 2010 discloses a solid state drive (SSD) including a synchronization device. The SSD may include a controller of the flash memory and a synchronization device connected to a non-volatile memory. When a power supply to the SSD is suspended, the synchronization device may prevent the non-volatile memory from operating without a control of the controller.

DISCLOSURE OF INVENTION

Technical Goals

An aspect of the present invention provides a method and a device for storing information on a change in metadata in a spare space of a physical page in which a logical page is stored through a compression.

Another aspect of the present invention provides a method and a device for recovering metadata provided during a power supply suspension based on information on a change in metadata.

Technical Solutions

According to an aspect of the present invention, there is provided a storage device including a flash memory to store data, a metadata synchronization unit to store, in a first physical page, metadata used to manage the data stored in the flash memory, and synchronize the metadata to the flash memory, and a page storage unit to store, in a second physical page, change information on the metadata and compressed data on at least one logical page, wherein the change information on the metadata may be information on a change in the metadata associated with the data on the at least one logical page.

The metadata may include a mapping table to map a logical page of the flash memory to a physical page of the flash memory, and a data structure used for garbage collection.

The change information may be a log of changes in the metadata.

The storage device may further include a power-loss recovery unit to sense an occurrence of a power supply suspension, apply the change information included in the second physical page, to the synchronized metadata included in the first physical page, and recover the metadata provided during the power supply suspension.

The second physical page may be at least one second physical page.

A third physical page of the at least one second physical page may include a page number of a fourth physical page, and the fourth physical page may be a page assigned subsequent to the third physical page of the at least one second physical page.

The power-loss recovery unit may sequentially apply the change information included in the at least one second physical page, to the synchronized metadata based on the number.

The volatile memory may store information on a validity of each of the at least one logical page stored in the second physical page The information on the validity may be used to limit a maximum number of the logical pages stored in the second physical page.

The metadata synchronization unit may store a first timestamp of the synchronized metadata in the first physical page, the page storage unit may store a second timestamp of the metadata in the second physical page, and the power-loss recovery unit may compare the first timestamp and the second timestamp, and when the metadata is synchronized in the first physical page, identify the physical page storing the change information.

According to another aspect of the present invention, there is also provided an operation method of a storage device, the method including storing, in a first physical page of a flash memory, metadata used for managing data stored in the flash memory, and synchronizing the metadata to the flash memory, and storing, in a second physical page of the flash memory, change information on the metadata and compressed data on at least one logical page, wherein the change information on the metadata may be information on changes in the metadata associated with the data on the at least one logical page.

The operation method of the storage device may further include sensing an occurrence of a power supply suspension, and applying the change information included in the second physical page, to the synchronized metadata included in the first physical page, and recovering the metadata provided during the power supply suspension.

Advantageous Effects

According to an aspect of the present invention, it is possible to provide a method and a device for storing information on a change in metadata in a spare space of a physical page in which a logical page is stored through a compression.

According to another aspect of the present invention, it is possible to provide a method and a device for recovering metadata provided during a power supply suspension based on information on a change in metadata.

According to still another aspect of the present invention, it is possible to recover metadata based on information on a change in the metadata and thus, a reliability of the metadata associated with all data stored in a flash memory may be ensured.

According to yet another aspect of the present invention, it is possible to recover metadata based on information on a change in the metadata and thus, a number of synchronizations of the metadata performed in a flash memory in preparation for a disappearance of the metadata may be decreased. Due to the decrease in the number of synchronizations, power consumption may be reduced and a durability of the flash memory may be increased.

BEST MODE FOR CARRYING OUT THE INVENTION

Figure 1:
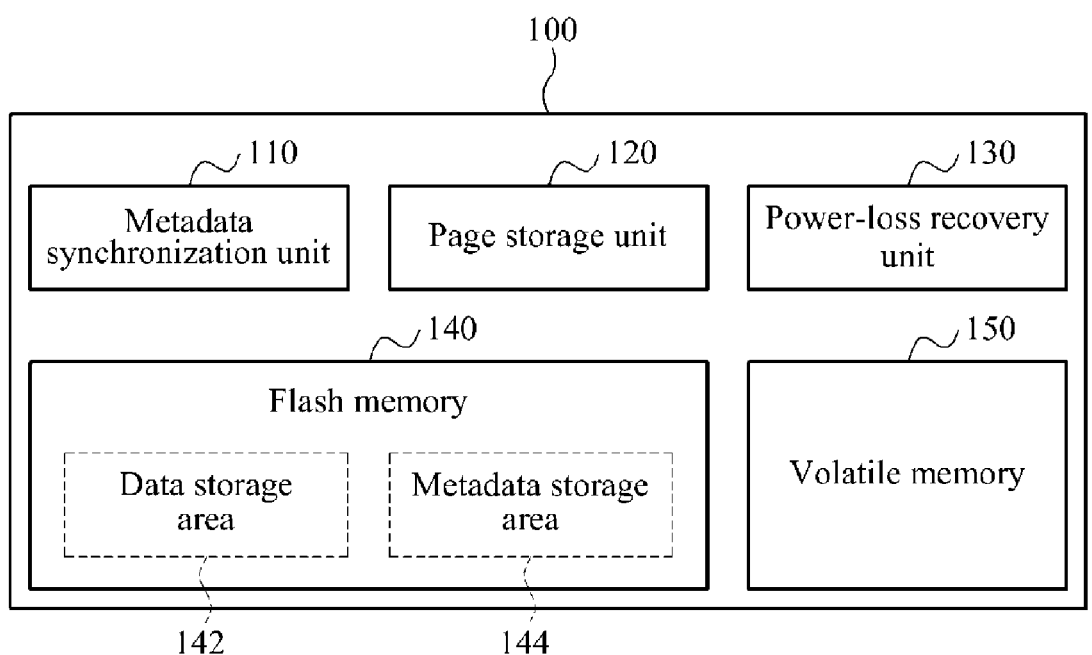
FIG. 1 is a configuration diagram illustrating a flash memory-based storage device according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a configuration diagram illustrating a flash memory-based storage device according to an embodiment of the present invention. A storage device 100 of FIG. 1 may be a solid state drive (SSD).

The storage device 100 may include a metadata synchronization unit 110, a page storage unit 120, a power-loss recovery unit 130, a flash memory 140, and a volatile memory 150.

The flash memory 140 and the volatile memory 150 may store data.

The flash memory 140 may include a data storage area 142 and a metadata storage area 144. The data storage area 142 may store data. The metadata storage area 144 may store metadata used to manage the data. The metadata may include a mapping table for mapping a logical page of the flash memory 140 to a physical page, and a data structure used for garbage collection.

The metadata synchronization unit 110 and the page storage unit 120 may be elements related to a management of data included in the flash memory 140 and metadata associated with the data.

The power-loss recovery unit 130 may be an element related to a recovery of the metadata from a power-loss when a power-supply is suspended and then, resumed to the storage device 100.

Hereinafter, descriptions about the aforementioned elements including the metadata synchronization unit 110, the page storage unit 120, the power-loss recovery unit 130, the flash memory 140, and the volatile memory 150 will be provided.

Figure 2:
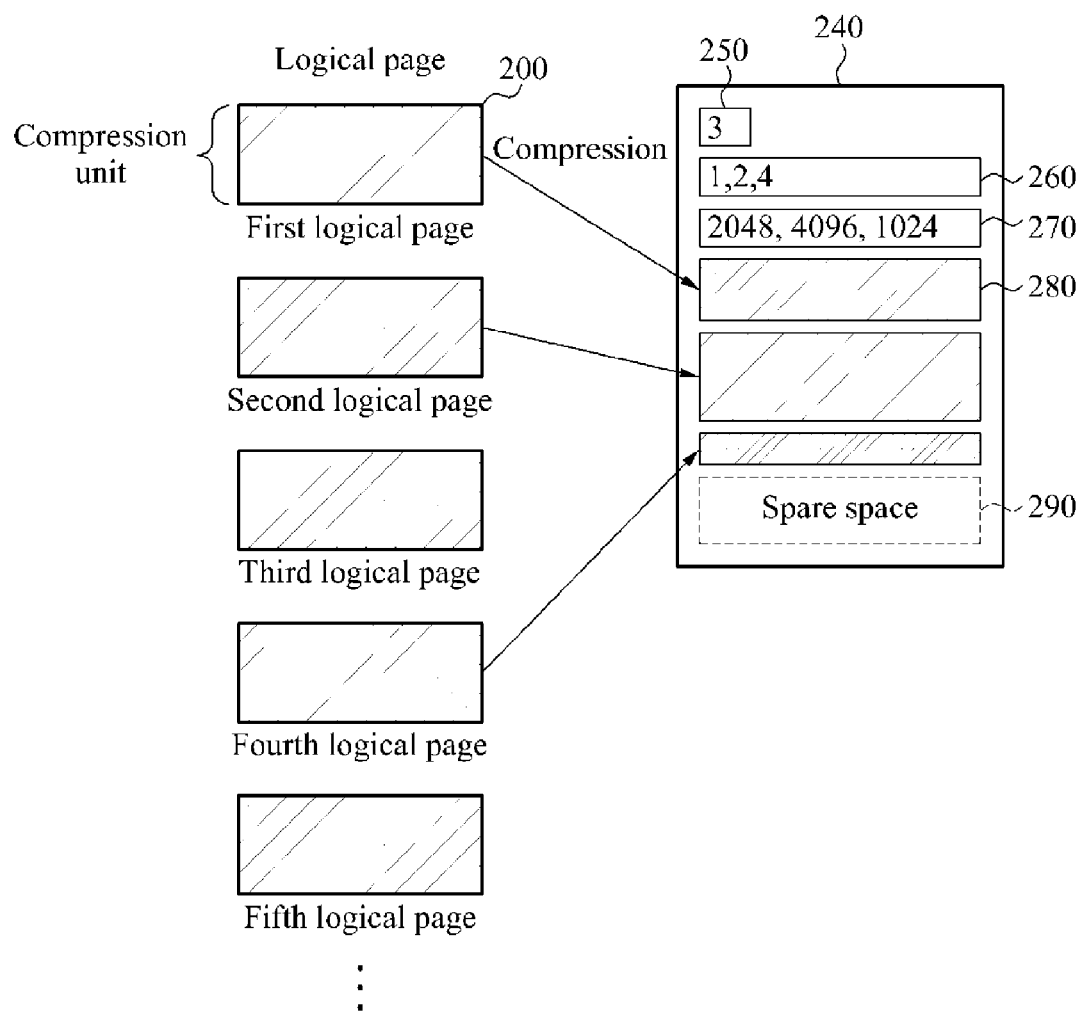
FIG. 2 is a diagram illustrating a compression unit of a logical page according to an embodiment of the present invention.

FIG. 2 is a diagram illustrating a compression unit of a logical page according to an embodiment of the present invention.

A size of a logical page 200 used by the storage device 100 may be set to be less than a size of a physical page 240. The page storage unit 120 may compress the logical page 200 and store the compressed logical page in the physical page 240. For example, the page storage unit 120 may use the logical page 200 as a compression unit, and the page storage unit 120 may set the compression unit using a unit less than the size of the physical page 240.

The logical page 200 may correspond to an index of a mapping table. Thus, a total number of indexes of the mapping table may be identical to a number of logical pages 200.

The page storage unit 120 may compress and store at least one logical page 200 in the physical page 240 of the flash memory 140. Thus, the physical page 240 may include compressed data 280 on the logical pages 200. For example, the physical page 240 in which the logical page storage unit 120 compresses and stores the at least one logical page 200 may be a physical page included in the data storage area 142 of the flash memory 140.

The physical page 240 may include 1) a number N 250 indicating the number of the logical pages 200 stored in the physical page 240, 2) a page number 260 of each of the (N) logical pages 200 stored in the physical page 240, 3) a quantity 270 of the compressed data 280 on each of the (N) logical pages 200 stored in the physical page 240, and 4) the compressed data 280 on each of the at least one logical page 200.

The page storage unit 120 may store the number N 250, the page number 260, the quantity 270, and the data 280 in the physical page 240.

A spare space 290 may be a remaining space of the physical page 240, aside from a space in which the number N 250, the page number 260, the quantity 270, and the data 280 are stored.

Figure 3:
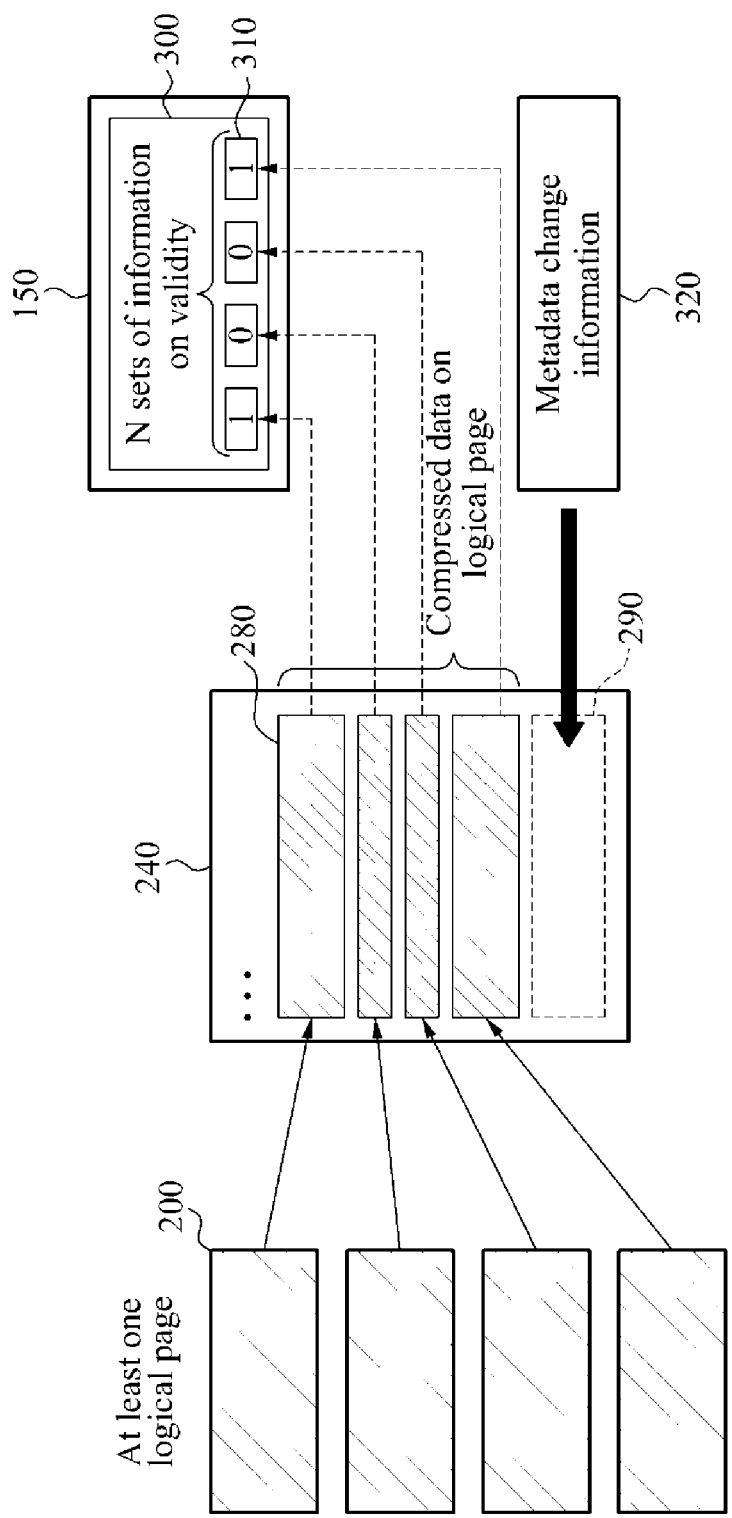
FIG. 3 is a diagram illustrating a configuration for storing change information associated with metadata in a spare space according to an embodiment of the present invention.

FIG. 3 is a diagram illustrating a configuration for storing change information on metadata in a spare space according to an embodiment of the present invention. Hereinafter, the change information on metadata may also be referred to as metadata change information.

A number of the logical pages 200 stored in the physical page 240 may be determined based on a quantity of the compressed data 280 on the logical pages 200.

A number of writings on the flash memory 140 may be decreased according to an increase in the number of the logical pages 200 stored in the physical page 240.

However, the number of the logical pages 200 included in the physical page 240 may be limited. For example, the volatile memory 150 may store information on a validity of the at least one logical page 200 stored in the physical page 240 for garbage collection. Information 300 on the validity may include at least one bit 310. The at least one bit 310 may include information indicating whether the logical page 200 stored in the physical page 240 is valid, for example, a value of the bit 310 is "1", or is invalid, for example, the value of the bit 310 is "0".

The information 300 on the validity may be used to limit the maximum number of the logical pages 200 stored in the physical page 240. For example, the information 300 on the validity includes the N bits 310, the physical page 240 may store up to the N logical pages 200.

When the limited number of the logical pages 200 is compressed and stored in the physical page 240, an internal fragmentation may occur in the physical page 240, and the physical page 240 may acquire the spare space 290 resulting from the occurrence of the internal fragmentation.

The page storage unit 120 may store metadata change information 320 in the spare space 290 of the physical page 240. The metadata change information 320 may indicate a change or a conversion in the metadata associated with data on the at least one logical page 200. Thus, the metadata change information 320 may be change information on metadata associated with data recorded in the physical page 240.

The metadata change information 320 may be a log of changes in the metadata. Thus, the change information 320 may be information in which the change in the metadata associated with the data, for example, the at least one logical page 200 stored in the physical page 240 is recorded.

Hereinafter, descriptions about information stored in the spare space 290 will be provided with reference FIG. 4.

Figure 4:
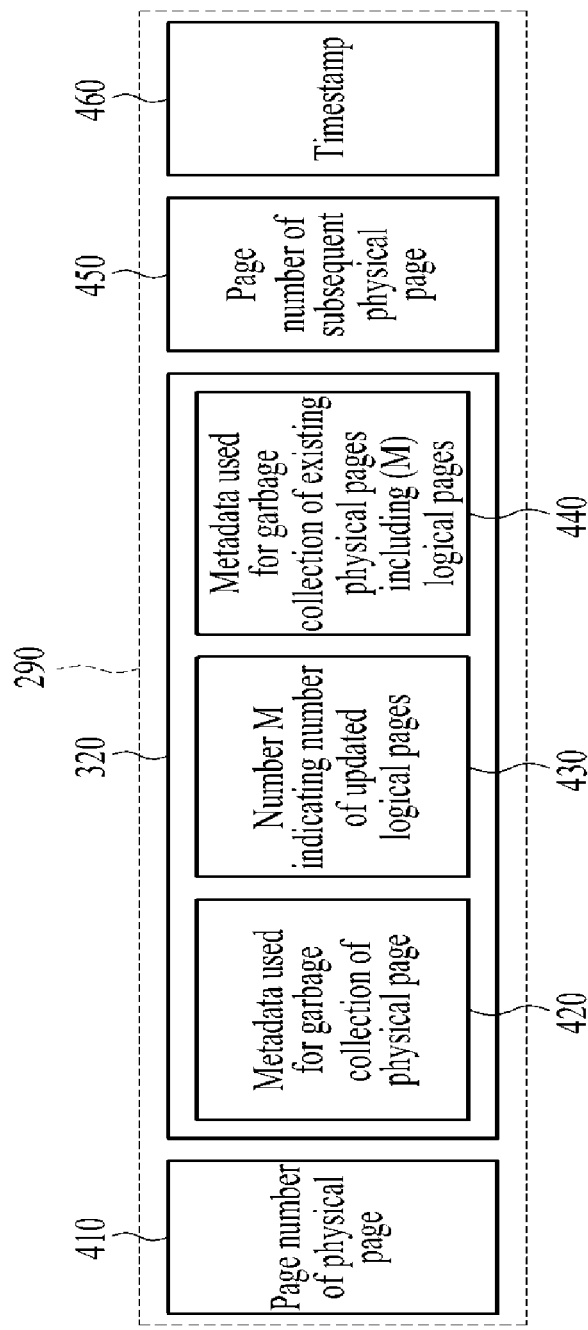
FIG. 4 is a diagram illustrating information stored in a spare space according to an embodiment of the present invention.

FIG. 4 is a diagram illustrating information stored in a spare space according to an embodiment of the present invention.

The page storage unit 120 may store, in the spare space 290, 1) a page number 410 of the physical page 240, 2) the metadata change information 320, and 3) a page number 450 of a subsequent physical page, and a timestamp 460.

The page number 410 of the physical page 240 may be a page number for identifying the physical page 240.

The metadata change information 320 may include metadata used for garbage collection of the physical page 240, 2) a number M 430 indicating a number of the logical pages 200 updated by the physical page 240, 3) M sets of metadata used for the garbage collection of existing M physical pages including each of M logical pages included in the physical page 240. Also, the metadata change information 320 may include at least one of the page number 410 of the physical page 240, the page number 450 of the subsequent physical page, and the timestamp 460.

The page number 450 of the subsequent physical page may be a page number of a physical page assigned by, for example, the page storage unit 120 subsequent to the physical page 240.

Due to properties of the flash memory 140, the page storage unit 120 may store, in the physical page 240, all data, for example, the number N 250 indicating the number of the logical pages 200 stored in the physical page 240, the page number 260, the quantity 270, and the data 280, the page number 410 of the physical page 240, the metadata change information 320, and the page number 450 of the subsequent physical page, and the timestamp 460, at once. The timestamp 460 may indicate a time at which the page storage unit 120 stores such data in the physical page 240.

Figure 5:
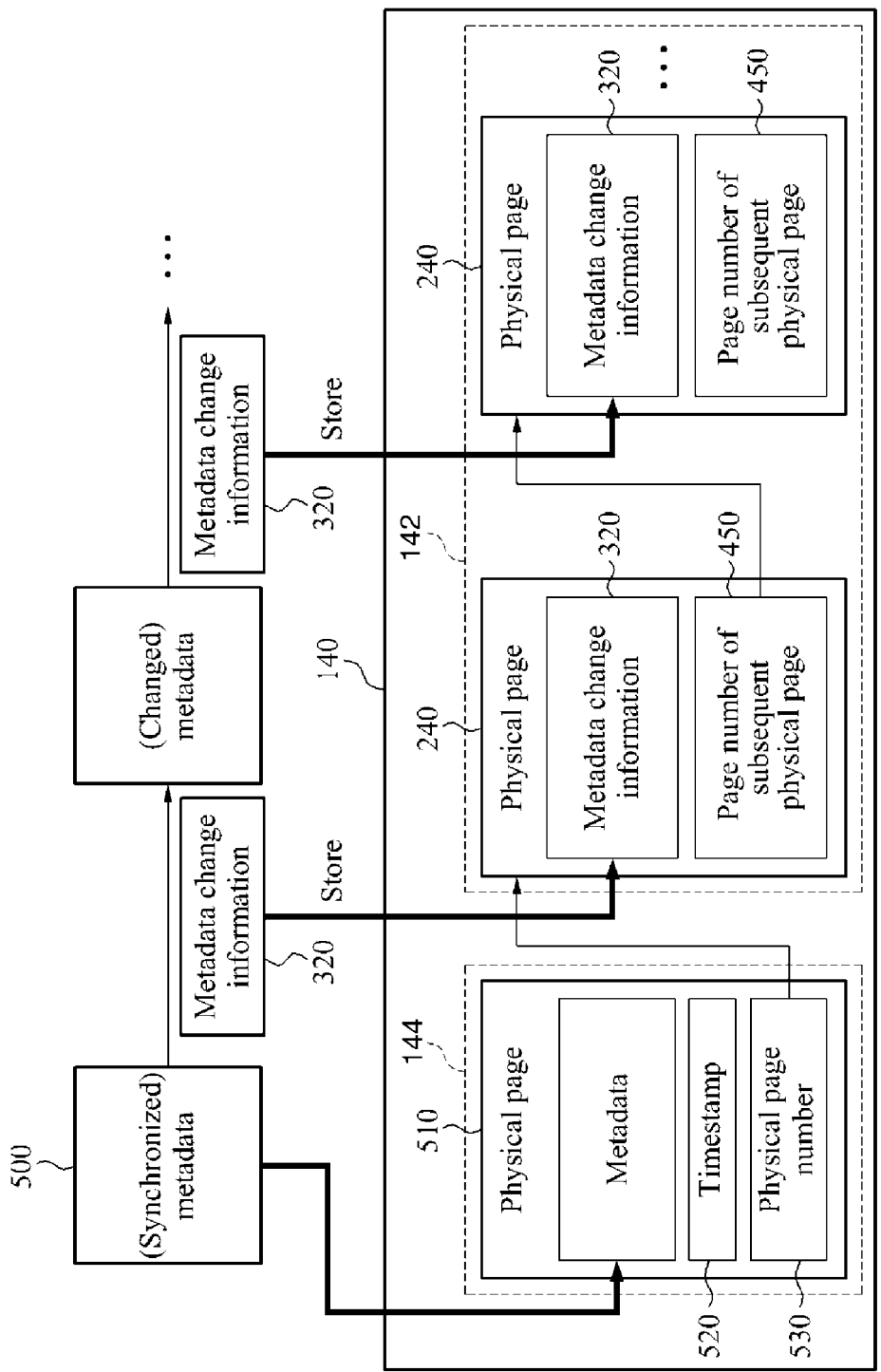
FIG. 5 is a diagram illustrating a synchronization of metadata according to an embodiment of the present invention.

FIG. 5 is a diagram illustrating a synchronization of metadata according to an embodiment of the present invention.

In order to archive metadata 500, aside from the metadata change information 320, the metadata 500 may need to be entirely synchronized to a physical page 510 of the flash memory 140.

The metadata synchronization unit 110 may store the metadata 500 in the physical page 510 and synchronize the metadata 500 to the flash memory 140. Here, the physical page 510 in which the metadata synchronization unit 110 stores the metadata 500 may be a physical page included in the metadata storage area 144 of the flash memory 140.

The metadata synchronization unit 110 may store a timestamp 520 and a physical page number 530 in the physical page 510. The timestamp 520 may indicate a time at which the metadata synchronization unit 110 stores the metadata 500 in a physical page.

The physical page number 530 may be a page number of the physical page 240 including the metadata change information 320 indicating the metadata is changed after the synchronization is performed.

The physical page 240 storing the logical pages 200 may not need to be entirely read in a process of recovering the metadata by storing the timestamp 520, the physical page number 530, and the metadata 510 in the physical page 510.

After the metadata 500 is synchronized by the metadata synchronization unit 110, the logical page 200 may also be generated, removed, or updated. When the metadata 500 and the logical page 200 is changed by the generating, the removing, or the updating, the page storage unit 120 may store the changed logical pages 200, the metadata change information 320, and the like in the at least one physical page 240. Hereinafter, the metadata 500 synchronized in the flash memory 140 by the metadata synchronization unit 110 may also be referred to as the synchronized metadata. The metadata 500 changed by the generating, the removing, or the updating of the logical page 200 after the synchronization is performed may also be referred to as the changed metadata.

The metadata synchronization unit 110 may perform the synchronization of the metadata 500 periodically.

Figure 6:
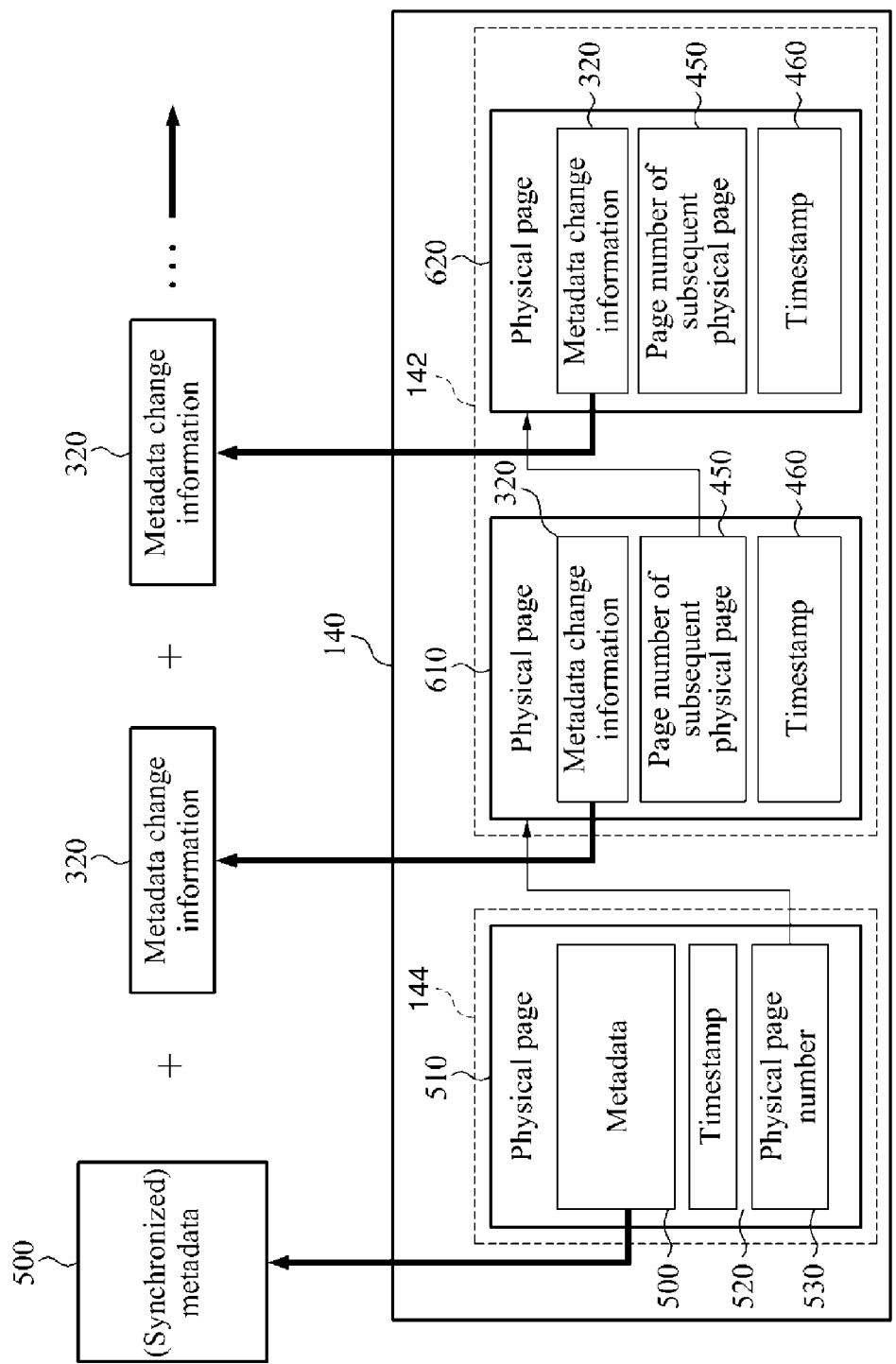
FIG. 6 is a diagram illustrating an operation of a power-loss recovery unit according to an embodiment of the present invention.

FIG. 6 is a diagram illustrating an operation of a power-loss recovery unit according to an embodiment of the present invention.

When the metadata 500 is synchronized in the flash memory 140, a power supply to the storage device 100 may be suspended. When the power supply is suspended, information on a change in the metadata provided after the synchronization is performed may be lost.

The physical page 510 to which the metadata 500 is synchronized may also be referred to as a first physical page. The physical page 240 in which the metadata change information 320 is stored may also be referred to as a second physical page. The second physical page may be at least one second physical page. Here, the at least one second physical page may indicate all of the physical pages 240 including the change information on the metadata 500 changed after the most recent synchronization of the metadata 500 is performed. In FIG. 2, two second physical pages may be provided. Among the second physical pages shown in the drawing, a physical page 610 may be referred to as a third physical page, and a physical page 620 may be referred to as a fourth physical page.

When the power supply to the storage device 100 is resumed, the storage device 100 or a host connected to the storage device 100 may perform booting. During the booting, the power-loss recovery unit 130 may sense an occurrence of a power supply suspension.

The power-loss recovery unit 130 may apply change information included in the second physical page to the synchronized metadata 500 included in the first physical page, and recover the metadata provided during the power supply suspension. For example, the power-loss recovery unit 130 may copy, to the volatile memory 150, the synchronized metadata 500 included in the first physical page, copy, to the volatile memory 150, the metadata change information 320 included in the second physical page, and apply the metadata change information 320 to the synchronized metadata 500, thereby recovering the metadata provided during the power supply suspension. The recovering may indicate applying change information indicated by a log of the change information 320, to the synchronized metadata 500.

When the second physical page is at least one second physical page, the power-loss recovery unit 130 may sequentially apply, to the synchronized metadata 500, the metadata change information 320 included in the at least one second physical page, and recover the metadata provided during the power supply suspension. The physical page 510 storing the synchronized metadata 500 may include the physical page number 530 of the third physical page. Thus, the power-loss recovery unit 130 may identify the third physical page including the metadata change information 320 to be applied at first. Also, the page number 450 of the subsequent physical page in the third physical page may include a page number of the fourth physical page. Thus, the third physical page may include the page number of the fourth physical page. The fourth physical page may be a page assigned subsequent to the third physical page among the at least one second physical page. The power-loss recovery 130 may refer the page number 450 of the subsequent physical page, and sequentially apply the metadata change information 320 included in the at least one physical page, to the synchronized metadata 500.

The power-loss recovery unit 130 may compare the timestamp 520 of the physical page 510 and a timestamp of the physical page 240, and identify the physical page 240 storing the metadata change information 320 after the metadata 500 is synchronized in the physical page 510.

Figure 7:
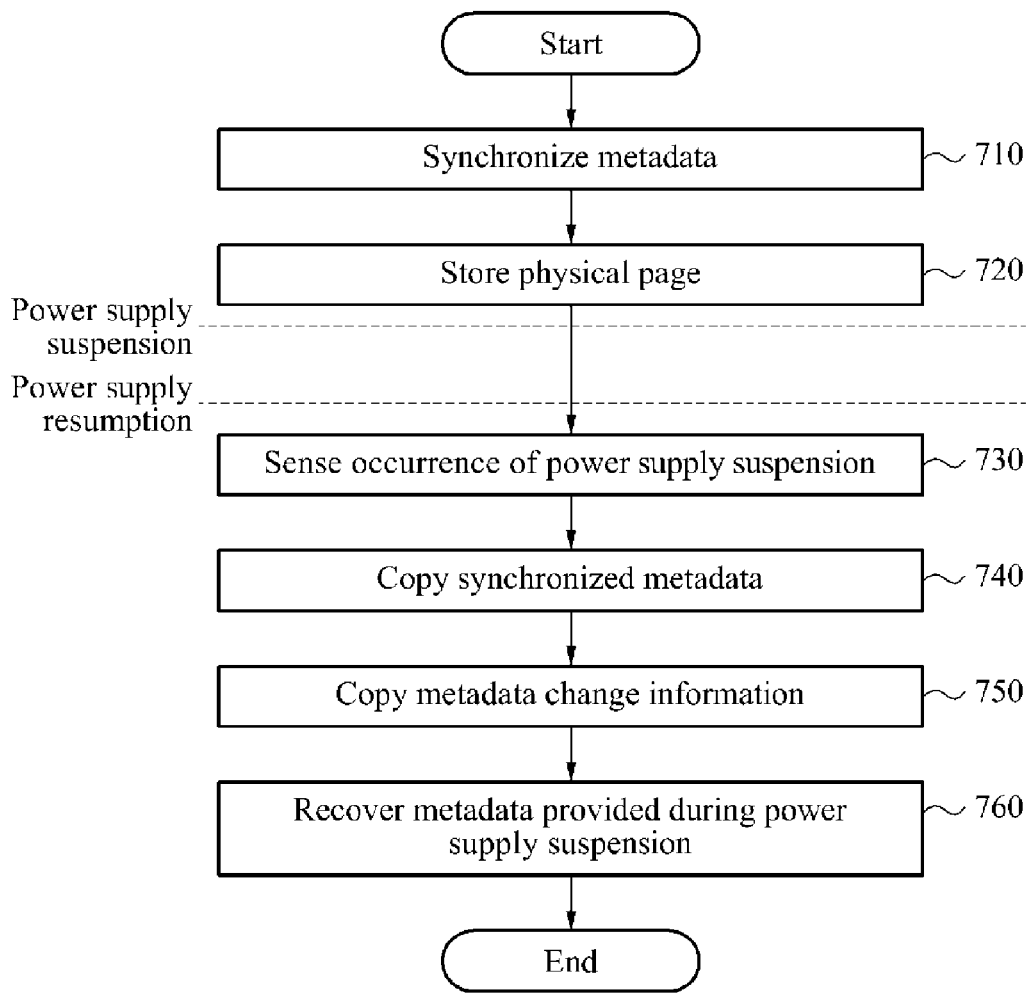
FIG. 7 is a flowchart illustrating an operation method of a storage device using a flash memory according to an embodiment of the present invention.

FIG. 7 is a flowchart illustrating an operation method of a storage device using a flash memory according to an embodiment of the present invention.

In operation 710, the metadata synchronization unit 110 may store the metadata 500 used to manage data stored in the flash memory 140, in a first physical page of the flash memory, and synchronize the metadata 500 to the flash memory 140.

In operation 720, the page storage unit 120 may store compressed data on the at least one logical page 200 and the metadata change information 320, in a second physical page of the flash memory 140. The metadata change information 320 may be information indicating a change in the metadata 500 associated with data on the at least one logical data 200.

In operation 730, the power-loss recovery unit 130 may sense an occurrence of a power supply suspension.

In operations 740 through 760, the power-loss recovery unit 130 may apply the metadata change information 320 included in the second physical page, to the synchronized metadata 500 included in the first physical page, and recover the metadata provided during the power supply suspension.

In operation 740, the power-loss recovery unit 130 may copy the synchronized metadata 500 included in the first physical page to the volatile memory 150.

In operation 750, the power-loss recovery unit 130 may copy the metadata change information 320 included in the second physical page to the volatile memory 150.

In operation 760, the power-loss recovery unit 130 may apply the metadata change information 320 to the synchronized metadata 500, and recover the metadata provided during the power supply suspension.

Descriptions provided with reference to FIGS. 1 through 6 according to an embodiment of the present invention may be identically applied to this example embodiment. Thus, repeated descriptions may be omitted for increased clarity and conciseness.

Figure 8:
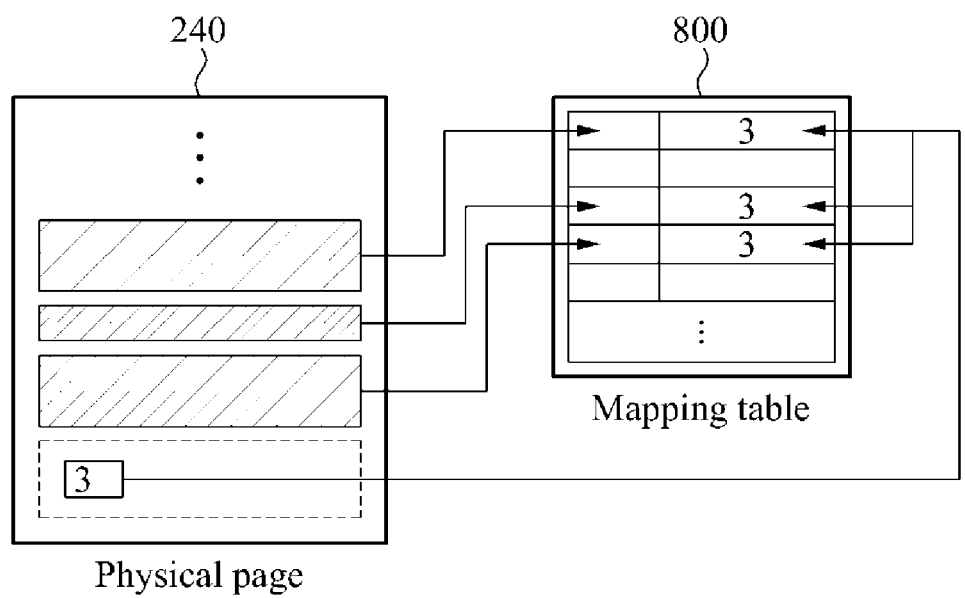
FIG. 8 is a diagram illustrating a recovery of metadata according to an example embodiment.

FIG. 8 is a diagram illustrating a recovery of metadata according to an example embodiment.

When a power supply suspension occurs, the power-loss recovery unit 130 may copy the metadata 500 most recently synchronized in the flash memory 140, to the volatile memory 150.

The power-loss recovery unit 130 may read the physical page 240 including the metadata change information 320 provided before the most recent synchronization of the metadata 500 is performed. The power-loss recovery unit 130 may change information on a mapping table 800 corresponding to a page number of the at least one logical page 200 included in the read physical page 240, to the page number 410 of the read physical page 240.

Also, the power-loss recovery unit 130 may recover metadata used for garbage collection based on the metadata change information 320, for example, the metadata 420 used for the garbage collection of a physical page, on the physical page 240. The power-loss recovery unit 130 may repetitively perform the aforementioned recovery operation using the page number 450 of the subsequent physical page. The power-loss recovery unit 130 may repetitively perform the aforementioned recovery operation until the timestamp 520 of the synchronized metadata 500 is less than the timestamp 460 of the physical page 240.

When the garbage collection occurs due to the aforementioned operation such that the physical page 240 is removed, and when the metadata change information 320 included in the removed physical page 240 includes information on a change in the metadata 500 provided after the most recent synchronization of the metadata 500 is performed, the metadata change information 320 may disappear and thus, an occurrence of the disappearance may need to be prevented. In this case, the power-loss recovery unit 130 may synchronize the metadata 500, based on information on the metadata 500 changed after the most recent synchronization of the metadata 500 is performed.

According to an embodiment of the present invention, it is possible to solve an issue that the metadata 500 associated with data stored in the flash memory 140 disappears due to a power supply suspension. Thus, according to an embodiment of the present invention, a reliability of the metadata 500 associated with the data stored in the flash memory 140 may be ensured. Also, a number of synchronizations of the metadata 500 performed to the flash memory 140, in preparation for an unpredicted disappearance may be decreased. Such a decrease may lead to a reduction of power consumption for writing the metadata 500, and an increase in a durability of the metadata storage area 144 storing the metadata 500.

Also, the page storage unit 120 may compress and store the logical pages 200 in the physical page 240, thereby reducing a number of writings as compared to writings performed without a compression.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A storage device comprising:
a flash memory to store data and including a data storage area and a metadata storage area,
the metadata storage area including a first physical page, and
the data storage area including a second physical page;
a metadata synchronization unit to store, in the first physical page, metadata used to manage the data stored in the flash memory, and synchronize the metadata to the flash memory;
a page storage unit to store, in the second physical page, change information on the metadata and compressed data on at least one logical page; and
a power-loss recovery unit to sense an occurrence of a power supply suspension, apply the change information included in the second physical page to the metadata included in the first physical page, and recover the metadata provided during the power supply suspension,
wherein the change information on the metadata is information on a change in the metadata associated with the compressed data of the at least one logical page, and includes
first information used for garbage collection of the second physical page, and
a number indicating a number of logical pages updated by the second physical page, and
wherein the first and second physical pages further include a page number of a subsequent second physical page which includes subsequent change information of the metadata.

2. The device of claim 1, wherein the metadata comprises a mapping table to map said at least one logical page of the flash memory to an at least one physical page of the flash memory, and a data structure used for garbage collection.

3. The device of claim 1, wherein the change information is a log of changes in the metadata.

4. The device of claim 1, wherein a third physical page of the at least one second physical page comprises a page number of a fourth physical page,
wherein the fourth physical page is a page assigned subsequent to the third physical page of the at least one second physical page, and
wherein the power-loss recovery unit sequentially applies the change information comprised in the at least one second physical page, to the synchronized metadata based on the number.

5. The device of claim 1, further comprising:
a volatile memory,
wherein the volatile memory stores information on a validity of each of the at least one logical page stored in the second physical page, and
wherein the information on the validity is used to limit a maximum number of the logical pages stored in the second physical page.

6. The device of claim 1, wherein the metadata synchronization unit stores a first timestamp of the metadata synchronized by the metadata synchronization unit in the first physical page,
wherein the page storage unit stores a second timestamp of the metadata in the second physical page, and
wherein the power-loss recovery unit compares the first timestamp and the second timestamp, and when the metadata is synchronized in the first physical page, identifies the physical page storing the change information.

7. An operation method of a storage device, the method comprising:
storing, in a first physical page of a flash memory, metadata used for managing data stored in the flash memory, and synchronizing the metadata to the flash memory; and
storing, in a second physical page of the flash memory, change information on the metadata and compressed data on at least one logical page;
sensing, by a power-loss recovery unit, an occurrence of a power supply suspension; and
applying, by the power-loss recovery unit, the change information included in the second physical page to the metadata included in the first physical page, and recovering the metadata provided during the power supply suspension,
wherein the change information on the metadata is information on a change in the metadata associated with the compressed data of the at least one logical page, and includes first information used for garbage collection of the second physical page, and a number indicating a number of logical pages updated by the second physical page, and wherein the first and second physical pages further include a page number of a subsequent second physical page which includes subsequent change information of the metadata.

\* \* \* \* \*